(12) United States Patent
Madrid et al.

(10) Patent No.: US 11,584,462 B2
(45) Date of Patent: Feb. 21, 2023

(54) PANEL STANDOFF AND STOPPER HOLE (71) Applicant: Honda Motor Co., Ltd., Tokyo (JP)

(72) Inventors: Francis M. Madrid, Dublin, OH (US); Brian Large, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 17/213,968

(22) Filed: Mar. 26, 2021

(65) Prior Publication Data
US 2022/0306221 A1  Sep. 29, 2022

(51) Int. Cl.
B60J 9/00     (2006.01)
B62D 63/04    (2006.01)
B62D 65/02    (2006.01)
B62D 29/04    (2006.01)

(52) U.S. Cl.
CPC ............. B62D 63/04 (2013.01); B62D 29/04 (2013.01); B62D 65/02 (2013.01)

(58) Field of Classification Search
CPC ......... B62D 63/04; B62D 29/04; B62D 65/02
See application file for complete search history.

(56) References Cited

U.S. PATENT DOCUMENTS

| | | | |
|---|---|---|---|
| 5,887,931 A | | 3/1999 | Bills et al. |
| 6,109,847 A | * | 8/2000 | Patel ........................ B60R 7/02 410/94 |
| 6,669,260 B2 | | 12/2003 | Clark et al. |
| 7,677,537 B2 | * | 3/2010 | Okanaka ............... F16F 13/101 267/152 |
| 7,802,955 B2 | | 9/2010 | Jatzke |
| 8,858,139 B2 | | 10/2014 | Prottengeier et al. |
| 9,248,783 B2 | * | 2/2016 | Thom ....................... B60R 7/02 |
| 9,381,871 B2 | | 7/2016 | Murray et al. |
| 9,944,333 B1 | | 4/2018 | Stojkovic et al. |
| 10,279,725 B2 | * | 5/2019 | Wilson ................... B60R 13/04 |
| 10,589,690 B2 | | 3/2020 | Torres Davalos et al. |
| 2011/0076092 A1 | * | 3/2011 | Joh ....................... F17C 13/001 403/42 |
| 2022/0063503 A1 | * | 3/2022 | Myszkowski ............ B60R 7/02 |

FOREIGN PATENT DOCUMENTS

| | | |
|---|---|---|
| CN | 102883904 | 1/2013 |
| CN | 204126430 | 1/2015 |
| CN | 205098089 | 3/2016 |

(Continued)

Primary Examiner — Kiran B Patel
(74) Attorney, Agent, or Firm — Mark E. Duell; Rankin Hill & Clark LLP (57) ABSTRACT A panel includes a standoff formed from a wall extended in a height direction from an exterior surface of the panel. The wall is formed from a first wall section and a second wall section that is offset from the first wall section in a lateral direction of the panel along the exterior surface of the panel. A stopper hole is defined in the panel and extended in the height direction, in parallel with the first wall section and the second wall section, from the exterior surface of the panel. The stopper hole receives a stopper. The stopper hole is interposed between and separates the first wall section and the second wall section along the exterior surface of the panel, or is offset from the wall of the standoff in the lateral direction of the panel along the exterior surface of the panel.

15 Claims, 8 Drawing Sheets (56) References Cited

FOREIGN PATENT DOCUMENTS

| | | |
|---|---:|---:|
| CN | 207773020 | 8/2018 |
| DE | 29710777 | 8/1997 |
| EP | 2127951 | 12/2009 |
| JP | 3042289 | 10/1997 |
| JP | 2003320892 | 11/2003 |
| JP | 2008155680 | 7/2008 |
| JP | 2008179210 | 8/2008 |
| JP | 5114791 | 10/2009 |
| KR | 101352743 | 1/2014 |
| WO | 2014095570 | 6/2014 |
| WO | 2019219427 | 11/2019 |

\* cited by examiner

PRIOR ART

FIG. 3B

PRIOR ART

PANEL STANDOFF AND STOPPER HOLE

BACKGROUND

Paneling is often employed to form walls which define distinct spaces such as rooms for user occupancy and storage areas, including rooms and storage areas in vehicles, where the paneling includes attachment features configured to fix the paneling with supporting structural elements. Known attachment features formed on paneling in an injection molding process and extend from paneling in various directions require separate, individual slides which define a space to be filled by a molding material, where the space defines an attachment feature. As such, paneling that includes many attachment features extended in different directions from a panel will require many slides to be used in forming the attachment features on the panel, resulting in a relatively complicated and often impractical manufacturing process for producing the panel. Consequently, there is demand for paneling which is capable of having multiple attachment features formed from a single slide in an injection molding process.

BRIEF DESCRIPTION

According to one aspect, a panel comprises a standoff formed from a wall extended in a height direction from an exterior surface of the panel, wherein the wall of the standoff is formed from a first wall section and a second wall section that is offset from the first wall section in a lateral direction of the panel along the exterior surface of the panel. A stopper hole is defined in the panel and extended in the height direction, in parallel with the first wall section and the second wall section, from the exterior surface of the panel, the stopper hole being configured for receiving a stopper formed from a material that is flexible and elastic as compared to the panel. The stopper hole is interposed between and separates the first wall section and the second wall section along the exterior surface of the panel, or is offset from the wall of the standoff in the lateral direction of the panel along the exterior surface of the panel.

According to another aspect, a method of manufacturing a standoff and a stopper hole in a panel includes driving a slide in a slide direction toward a molding apparatus, wherein the slide includes a projection and a barrier extended from a base portion of the slide, and extended in the slide direction, wherein the barrier defines a space in the slide. The method also includes injecting a molding material into the space defined by the barrier such that the molding material forms the standoff including a wall disposed on an exterior surface of the panel, where the projection obstructs the molding material from traveling into a volume occupied by the projection, and the volume occupied by the projection defines the stopper hole in the in the panel.

According to another aspect, a panel has a standoff including a wall formed on an exterior surface of the panel by injecting a molding material in a space defined by a barrier fixed with a slide. The panel also includes a stopper hole defined in the panel and formed around a projection fixed with the slide, where the projection obstructs the molding material from traveling into a volume occupied by the projection when the molding material is injected into the space defined by the slide, and the volume occupied by the projection defines the stopper hole in the panel.

DETAILED DESCRIPTION

Figure 1:
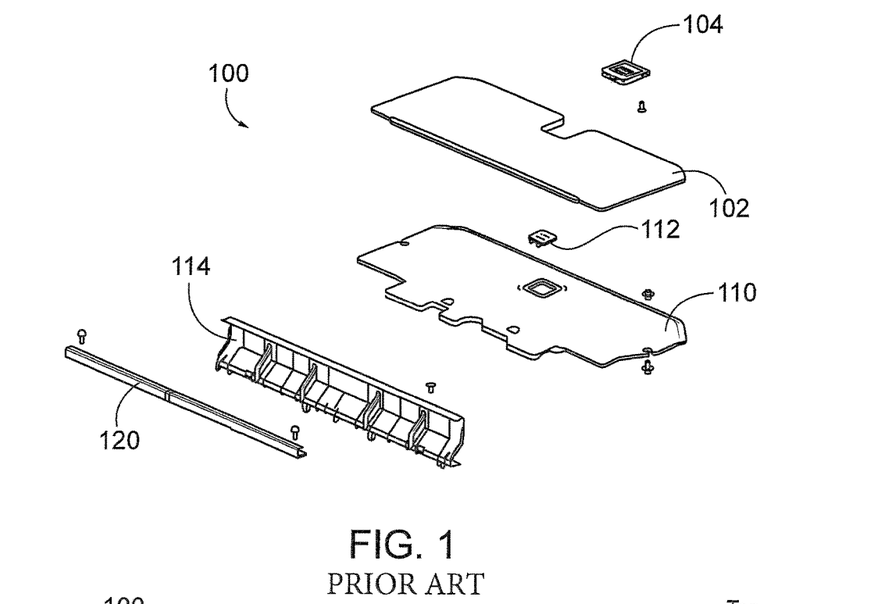
FIG. 1 depicts an exploded perspective view of a known storage area assembly for a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a prior art storage area assembly 100 including a cargo lid 102 with a handle 104, a lining 110 with a spare tire plug 112 configured for enabling selective user access to a spare tire (not shown) stored underneath the cargo lid 102 and the lining 110, a cargo bin divider or panel 114, and a cargo support bar 120.

Figure 2A:
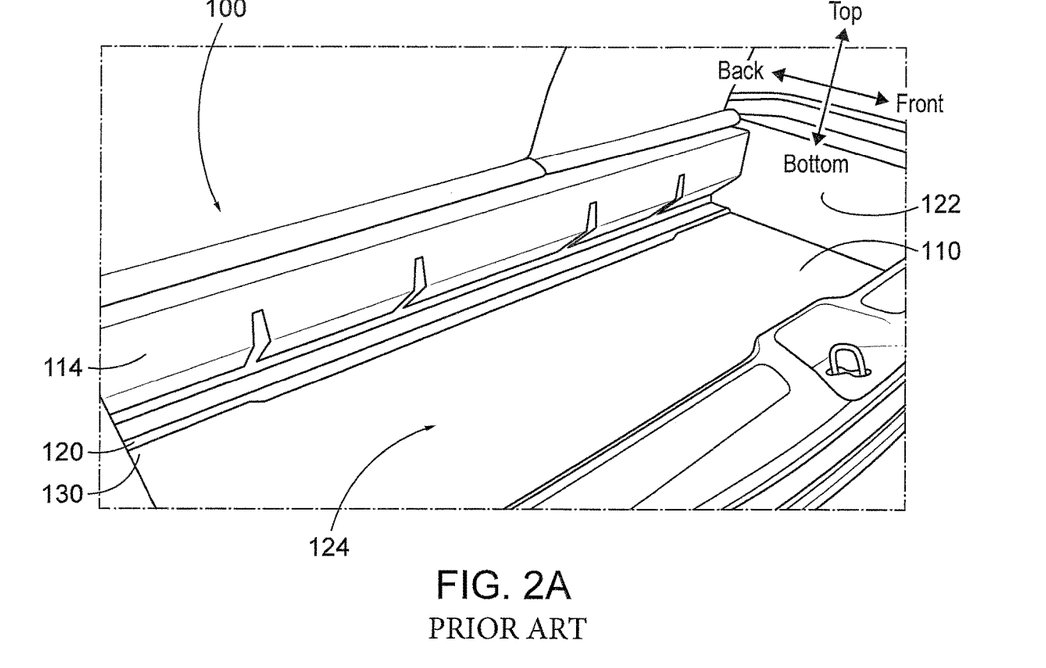
FIG. 2A depicts a perspective view of the prior art storage area assembly.

FIG. 2A depicts a perspective view of the storage area assembly 100 disposed in a vehicle 122. As shown in FIG. 2A, the storage area assembly 100 at least partially forms a storage area 124 in the vehicle 122, where the cargo bin divider 114 is mounted on the cargo support bar 120 and fixed with the lining 110. The cargo bin divider 114 is fixed with the lining 110 in the vehicle 122 at a front end 130 of the lining 110 with respect to a front-back direction of the vehicle 122 to function as a barrier defining a front end of the storage area assembly 100 and the storage area 124 with respect to the front-back direction of the vehicle 122.

Figure 2B:
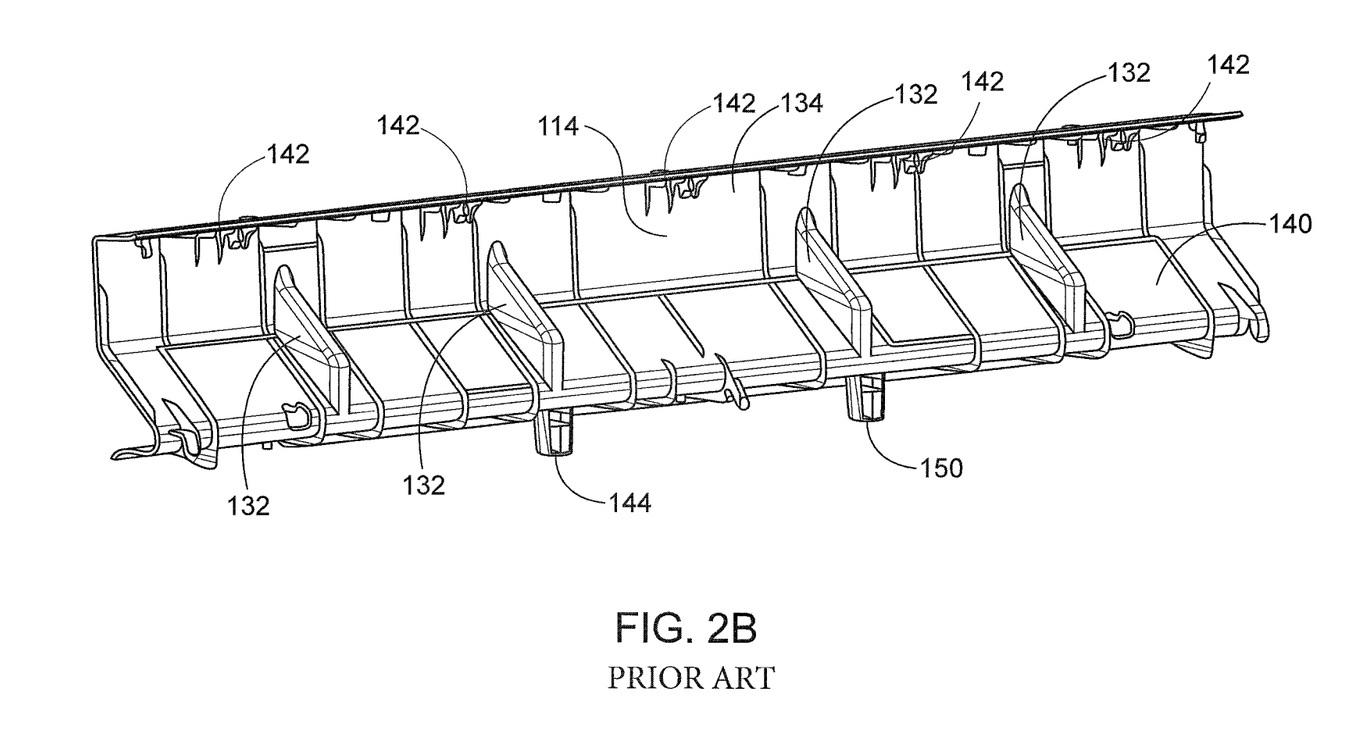
FIG. 2B depicts a perspective view of a cargo panel included in the prior art storage area assembly.

FIG. 2B depicts a perspective view of the cargo bin divider 114. As shown in FIG. 2B, the cargo bin divider 114 includes a first panel section 134 and a second panel section 140 with ribs 132 disposed between the first panel section 134 and the second panel section 140. The ribs 132 are configured to hold cargo dividers (not shown) in the storage area 124, and to provide structural support between the first panel section 134 and the second panel section 140. The cargo bin divider 114 also includes clips 142 extended from the first panel section 134, the clips 142 being configured for attaching the cargo bin divider 114 to the vehicle 122.

A first standoff 144 and a second standoff 150 extend from the second panel section 140 and are complementary with a portion (not shown) of the vehicle 122 for engaging the vehicle 122 and locating the cargo bin divider 114 in the vehicle 122 with the storage area assembly 100. The first standoff 144 features a construction similar to the second standoff 150 and unless otherwise stated, the following description made with reference to the first standoff 144 is similarly applicable to the second standoff 150.

Figure 2C:
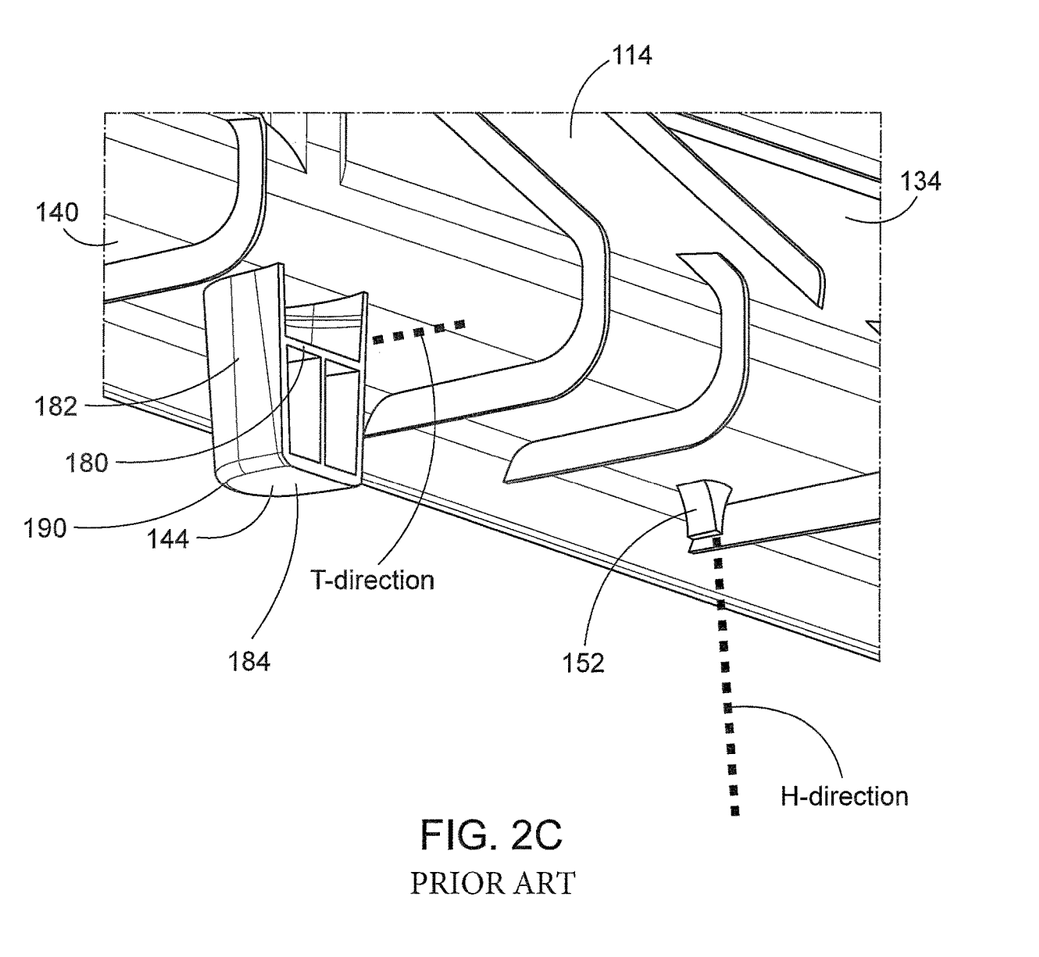
FIG. 2C depicts a partial bottom perspective view of the prior art cargo panel.

FIG. 2C depicts a partial perspective view of the cargo bin divider 114, including the first standoff 144 and a stopper 152 disposed in the second panel section 140. The stopper 152 extends from a same side of the second panel section 140 as the first standoff 144 to engage the cargo lid 102 and dampen vibration between the cargo bin divider 114 and the cargo lid 102 at the second panel section 140 where the first standoff 144 engages the vehicle 122.

Figure 3A:
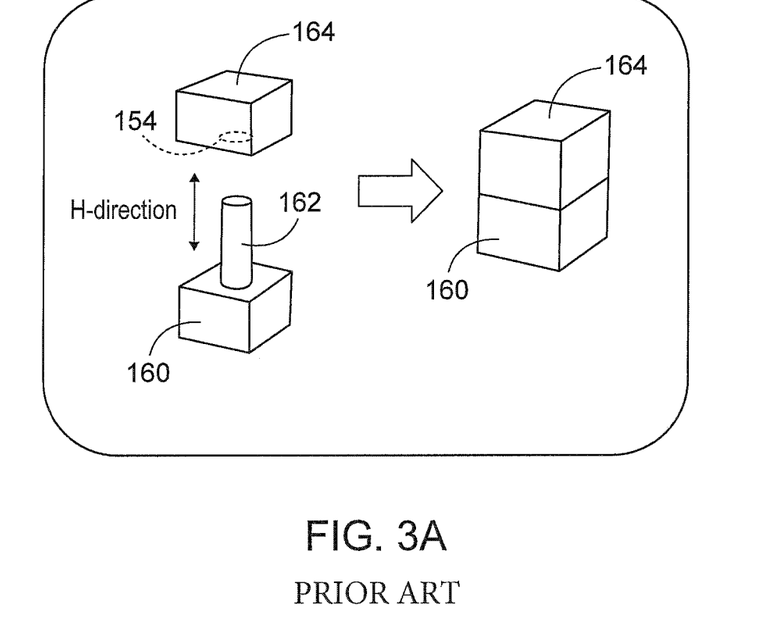
FIG. 3A depicts a schematic view of a prior art method for forming a stopper hole in the prior art cargo panel.

FIG. 3A depicts a known process for manufacturing a stopper hole 154, shown in hidden lines, and defined in the cargo bin divider 114. As shown in FIG. 2C, the cargo bin divider 114 is configured for receiving the stopper 152 in the stopper hole 154. As shown in FIG. 3A, a first slide 160 including a projection 162 extended from the first slide 160 is driven in an H-direction that is a height direction of the cargo bin divider 114 to engage a first housing portion 164 of an injection molding assembly such that the projection 162 occupies the first housing portion 164 and a molding material provided in the injection molding assembly defines the stopper hole 154 around the projection 162. The projection 162 extends from the first slide 160 in the H-direction, and because the first slide 160 is driven toward the first housing portion 164 in the H-direction, the stopper hole 154 formed from the molding material around the projection 162 extends into the cargo bin divider 114 in the H-direction.

Figure 3B:
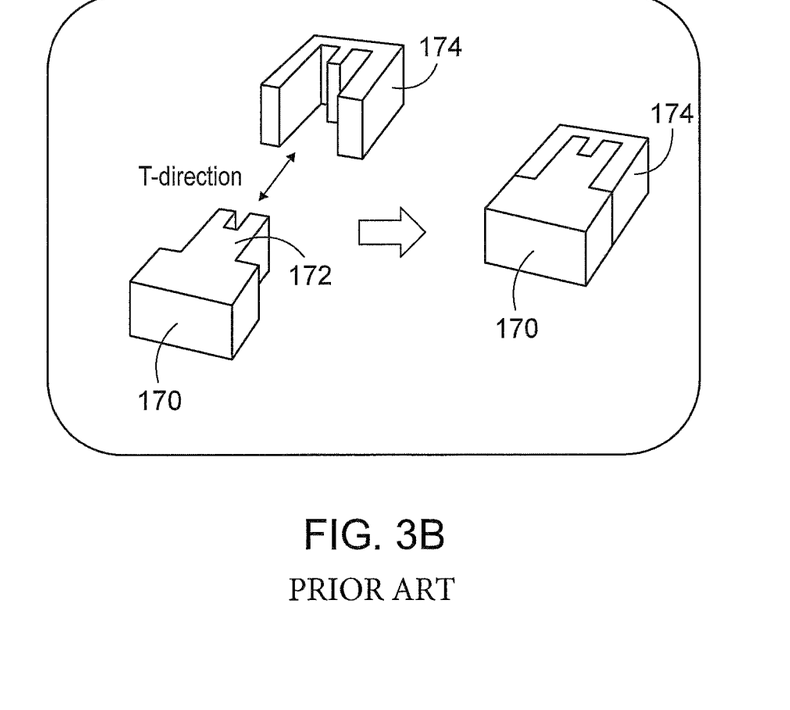
FIG. 3B depicts a schematic view of a prior art method for forming a standoff on the prior art cargo panel.

FIG. 3B depicts a process for manufacturing the first standoff 144, where a second slide 170 including a barrier 172 extended from the second slide 170 is driven in a T-direction that is a transverse direction of the cargo bin divider 114 to engage a second housing portion 174 of the injection molding assembly such that the barrier 172 defines a space in the injection molding assembly with the second housing portion 174. When a molding material is provided in the space defined by the barrier 172 and the second housing portion 174, as shown in FIG. 2C, the molding material forms the first standoff 144 on the cargo bin divider 114 with a rib structure 180 disposed in the first standoff 144 and extended in the T-direction connect wall sections 182 forming the first standoff 144 to structurally support the first standoff 144 on the cargo bin divider 114. The molding material also forms the first standoff 144 with a cap 184 at a distal end 190 of the first standoff 144, where the cap 184 is extended in the T-direction with the rib structure 180 and interposed between the wall sections 182 to connect the wall sections 182, cover the first standoff 144 in the H-direction to close a space defined between the wall sections 182, and structurally support the first standoff 144 on the cargo bin divider 114 at the distal end 190 of the first standoff 144.

With continued reference to FIG. 2C, the H-direction along which the first slide 160 is driven to form the stopper hole 154 and the T-direction along which the second slide 170 is driven to form the first standoff 144 are different directions that are not parallel with each other. As such, the first standoff 144 and the stopper hole 154 are necessarily formed using separate slides in the first slide 160 and the second slide 170 because the first slide 160 and the second slide 170 are driven in different directions to respectively form the first standoff 144 and the stopper hole 154 on the cargo bin divider 114.

Figure 4A:
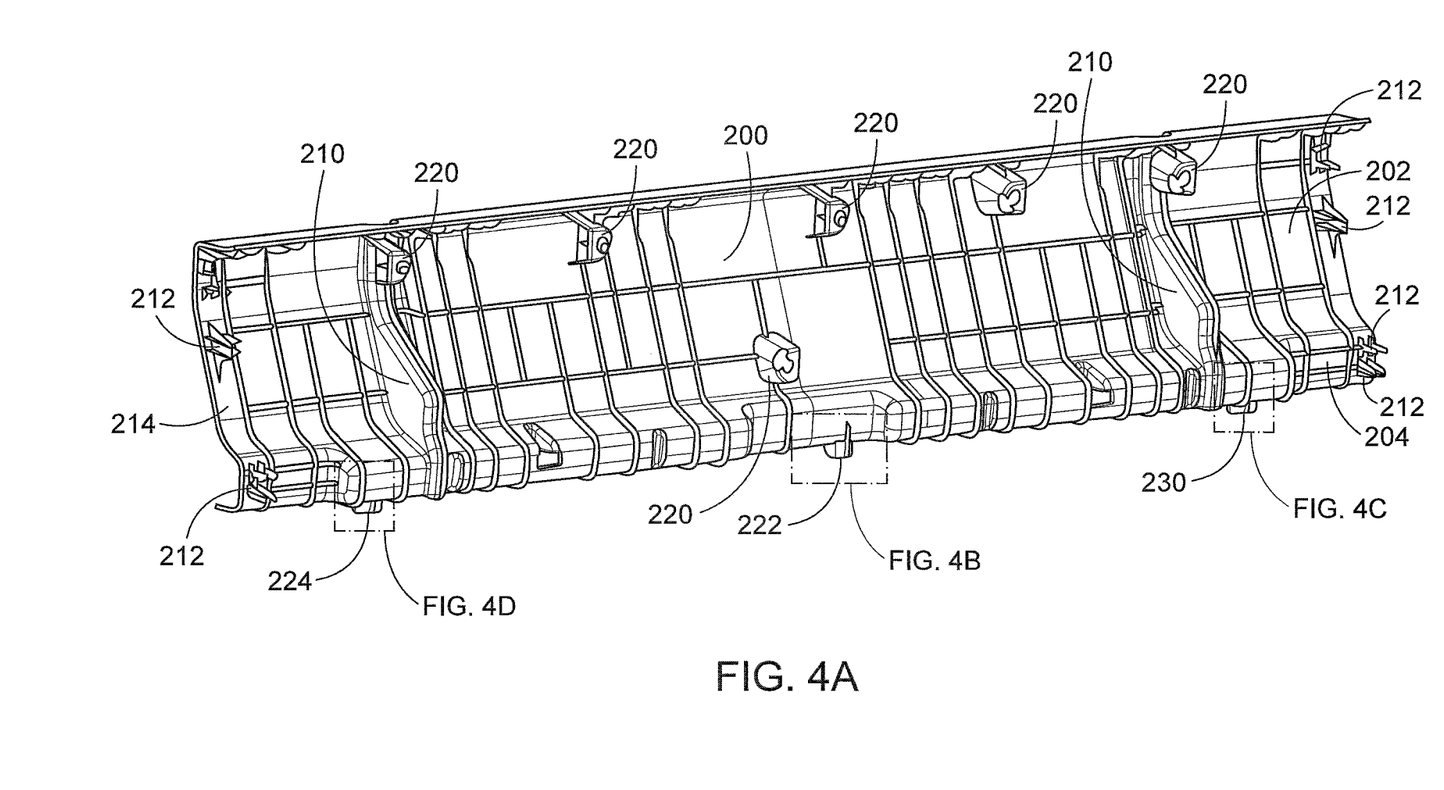
FIG. 4A depicts a perspective view of a cargo panel according to the present disclosure.

FIG. 4A depicts a cargo bin divider or panel 200 according to the present disclosure. The exemplary panel 200 is formed from a first panel section 202 and a second panel section 204 with ribs 210 disposed between the first panel section 202 and the second panel section 204. The ribs 210 are configured to hold removable cargo dividers (not shown), and to provide structural support between the first panel section 202 and the second panel section 204. Clips 212 included on the panel 200 extend outward from an exterior surface 214 of the panel 200 in a longitudinal direction of the panel 200, the longitudinal direction of the panel 200 being in a front-back direction of a vehicle (not shown) when the panel 200 is assembled with the vehicle, and the clips 212 are configured for fixing the panel 200 to complementary portions of the vehicle. Doghouses 220 included on the panel at the first panel section 202 extend outward from the exterior surface 214 of the panel 200 in the longitudinal direction of the panel 200, and are configured for locating the panel 200 in the vehicle with respect to a vertical or height direction of the panel 200 and a lateral direction of the panel 200 using complementary portions of the vehicle, where the vertical direction of the panel 200 is in a height direction of the vehicle and the lateral direction of the panel 200 is in a width direction of the vehicle when the panel 200 is assembled with the vehicle.

A first standoff 222, a second standoff 224, and a third standoff 230 included in the panel 200 at the second panel section 204 extend outward from the exterior surface 214 of the panel 200, downward in the vertical direction of the panel 200. The first standoff 222, the second standoff 224, and the third standoff 230 are configured for locating the panel 200 in the vehicle with respect to the longitudinal direction of the panel 200 and the lateral direction of the panel 200.

Figure 4B:
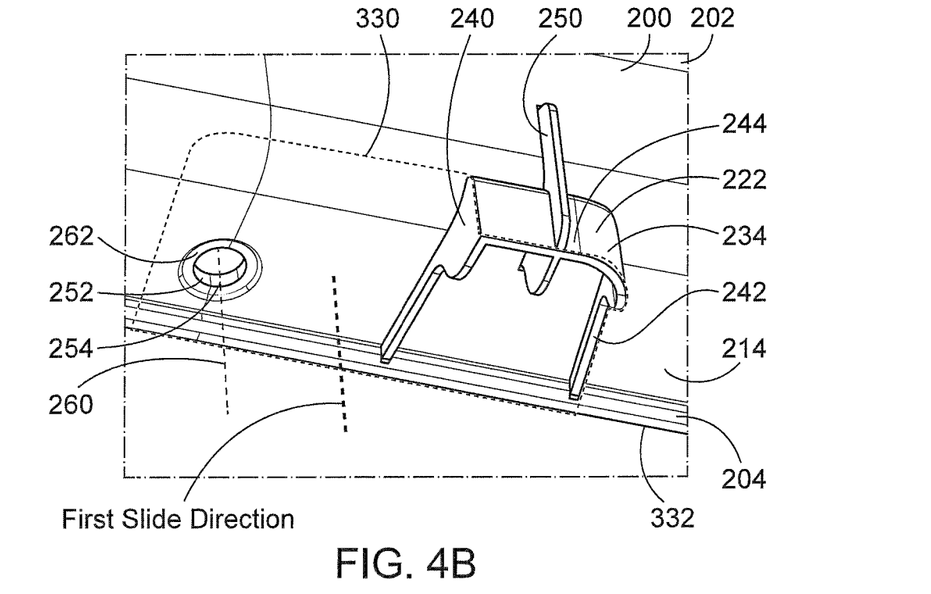
FIG. 4B depicts a partial bottom perspective view of the panel of FIG. 4A.

FIG. 4B depicts a bottom perspective view of the panel 200 including the first standoff 222. As shown, the first standoff 222 is formed from a wall 234 extended in a first slide direction from the exterior surface 214 of the panel 200, the first slide direction being oriented in the vertical direction of the panel 200. The wall 234 is formed from a first wall section 240 oriented along the exterior surface 214 of the panel 200 toward the longitudinal direction of the panel 200, a second wall section 242 that is oriented along the exterior surface 214 of the panel 200 toward the longitudinal direction of the panel 200 and offset from the first wall section 240 in the lateral direction of the panel 200 along the exterior surface 214 of the panel 200, and a third wall section 244 oriented along the lateral direction of the panel 200 and positioned between the first wall section 240 and the second wall section 242 in the lateral direction of the panel 200. In the depicted aspect, the first wall section 240, the second wall section 242, and the third wall section 244 are integrally formed with each other and respectively extend from the exterior surface 214 of the panel 200 in the first slide direction. In an embodiment, the first standoff 222 is integrally formed with the panel 200, and in a further embodiment the panel 200 and the first standoff 222 are integrally formed with each other in an injection molding manufacturing process.

The wall 234 includes a rib 250 extended from the exterior surface 214 of the panel 200 in the first slide direction. The rib 250 in the wall 234 of the first standoff 222 is oriented toward the longitudinal direction of the panel 200 and intersects the third wall section 244 at a location between the first wall section 240 and the second wall section 242 along the lateral direction of the panel 200.

A first stopper hole 252 is defined in the panel 200 extends into the panel 200 in the first slide direction from the exterior surface 214 of the panel 200. The first stopper hole 252 extends into the panel 200 from the exterior surface 214 of the panel 200 at a same side of the panel 200 from which the wall 234 of the first standoff 222 is extended, and is a through hole located at the second panel section 204. The first stopper hole 252 has a circular profile taken in the first slide direction, with an inner surface 254 that has a circumference defined around a stopper hole axis 260 extended in the first slide direction, and extended in parallel with the wall 234 of the first standoff 222. The first stopper hole 252 includes a seat 262 that is a counterbore centered on the first stopper hole 252.

Figure 4C:
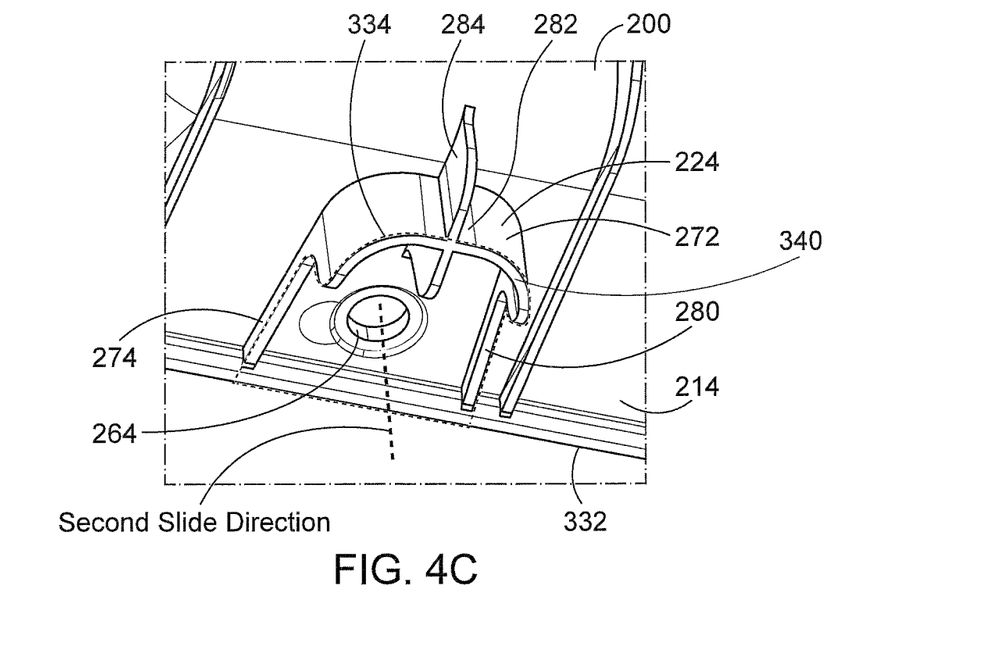
FIG. 4C depicts a partial bottom perspective view of the panel of FIG. 4A.
Figure 4D:
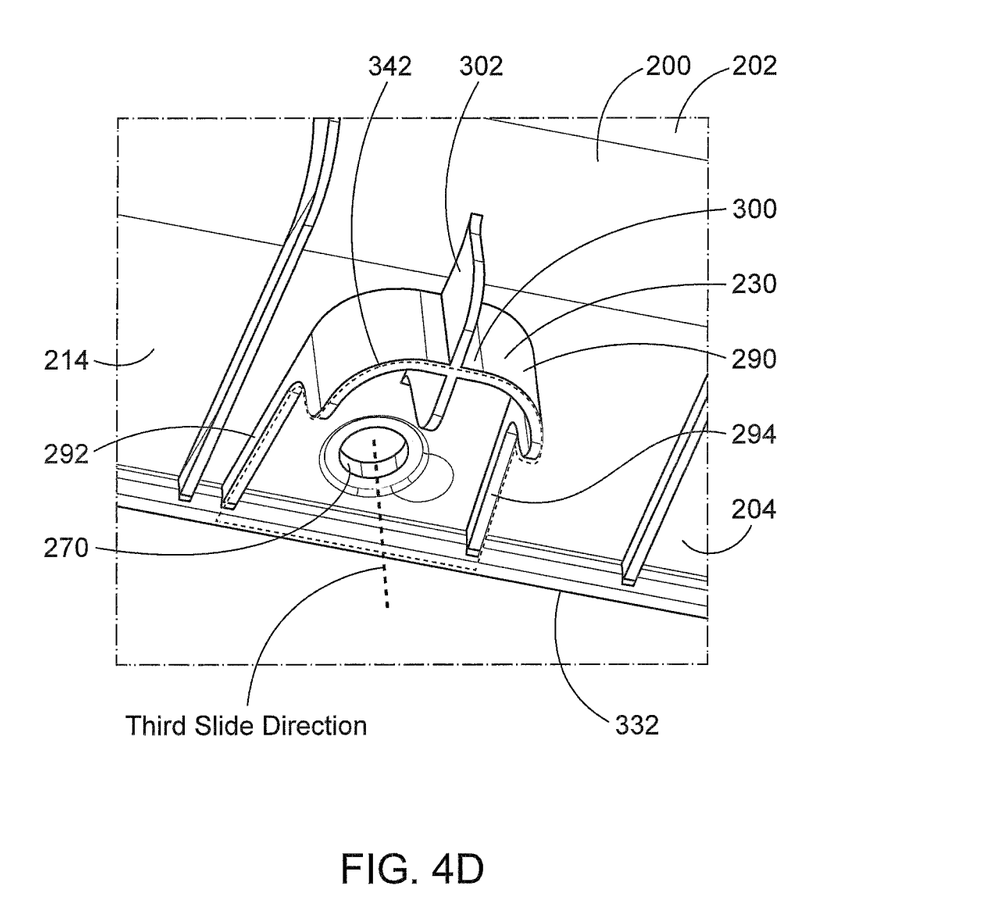
FIG. 4D depicts a partial bottom perspective view of the panel of FIG. 4A.

With continued reference to FIG. 4B, the first standoff 222 is offset from the first stopper hole 252 in the lateral direction of the first stopper hole 252 along the exterior surface 214 of the panel 200 and occupies a same position on the exterior surface 214 of the panel 200 with respect to the longitudinal direction of the panel 200. FIG. 4C depicts a bottom perspective view of the panel 200 including the second standoff 224 and a second stopper hole 264, and FIG. 4D depicts a bottom perspective view of the panel 200 including the third standoff 230 and the third stopper hole 270. Unless otherwise stated, the second standoff 224 and the second stopper hole 264 respectively include similar features and function in a similar manner as the first standoff 222 and the first stopper hole 252, and the third standoff 230 and the third stopper hole 270 respectively include similar features and function in a similar manner as the first standoff 222 and the first stopper hole 252.

As shown in FIG. 4C, the second standoff 224 is formed from a wall 272 extended in a second slide direction from the exterior surface 214 of the panel 200, the second slide direction being oriented in the vertical direction of the panel 200. The wall 272 is formed from a first wall section 274 oriented along the exterior surface 214 of the panel 200 toward the longitudinal direction of the panel 200, a second wall section 280 that is oriented along the exterior surface 214 of the panel 200 toward the longitudinal direction of the panel 200 and offset from the first wall section 274 in the lateral direction of the panel 200 along the exterior surface 214 of the panel 200, and a third wall section 282 oriented along the lateral direction of the panel 200 and positioned between the first wall section 274 and the second wall section 280 in the lateral direction of the panel 200. The first wall section 274, the second wall section 280, and the third wall section 282 of the wall 272 forming the second standoff 224 at least partially encircle the second stopper hole 264 at the exterior surface 214 of the panel 200 such that the second stopper hole 264 is interposed between and separates the first wall section 274 and the second wall section 280 along the exterior surface 214 of the panel 200 in the lateral direction of the panel 200.

The wall 272 forming the second standoff 224 includes a rib 284 extended from the exterior surface 214 of the panel 200. The rib 284 is oriented toward the longitudinal direction of the panel 200 and intersects the third wall section 282 at a location between the first wall section 274 and the second wall section 280 along the lateral direction of the panel 200. As such, the rib 284 in the wall 272 forming the second standoff 224 is aligned with the second stopper hole 264 along the longitudinal direction of the panel 200 to occupy a same position on the exterior surface 214 of the panel 200 with respect the lateral direction of the panel 200.

As depicted, the second slide direction is parallel with the first slide direction. While the depicted second slide direction is parallel with the first slide direction, it should be appreciated that the second slide direction may alternatively be a different direction from the first slide direction that is not parallel with the first slide direction without departing from the scope of the present disclosure.

As shown in FIG. 4D, the third standoff 230 is formed from a wall 290 extended in a third slide direction from the exterior surface 214 of the panel 200, the third slide direction being oriented in the vertical direction of the panel 200. The wall 290 is formed from a first wall section 292 oriented along the exterior surface 214 of the panel 200 toward the longitudinal direction of the panel 200, a second wall section 294 that is oriented along the exterior surface 214 of the panel 200 toward the longitudinal direction of the panel 200 and offset from the first wall section 292 in the lateral direction of the panel 200 along the exterior surface 214 of the panel 200, and a third wall section 300 oriented along the lateral direction of the panel 200 and positioned between the first wall section 292 and the second wall section 294 in the lateral direction of the panel 200. The first wall section 292, the second wall section 294, and the third wall section 300 of the wall 290 forming the third standoff 230 at least partially encircle the third stopper hole 270 at the exterior surface 214 of the panel 200 such that the third stopper hole 270 is interposed between and separates the first wall section 292 and the second wall section 294 along the exterior surface 214 of the panel 200 in the lateral direction of the panel 200.

The wall 290 forming the third standoff 230 includes a rib 302 extended from the exterior surface 214 of the panel 200. The rib 302 is oriented toward the longitudinal direction of the panel 200 and intersects the third wall section 300 at a location between the first wall section 292 and the second wall section 294 along the lateral direction of the panel 200. As such, the rib 302 in the wall 290 forming the third standoff 230 is aligned with the third stopper hole 270 along the longitudinal direction of the panel 200 to occupy a same position on the exterior surface 214 of the panel 200 with respect the lateral direction of the panel 200.

As depicted, the third slide direction is parallel with the first slide direction. While the depicted third slide direction is parallel with the first slide direction, it should be appreciated that the third slide direction may alternatively be a different direction from the first slide direction that is not parallel with the first slide direction without departing from the scope of the present disclosure.

Figure 5:
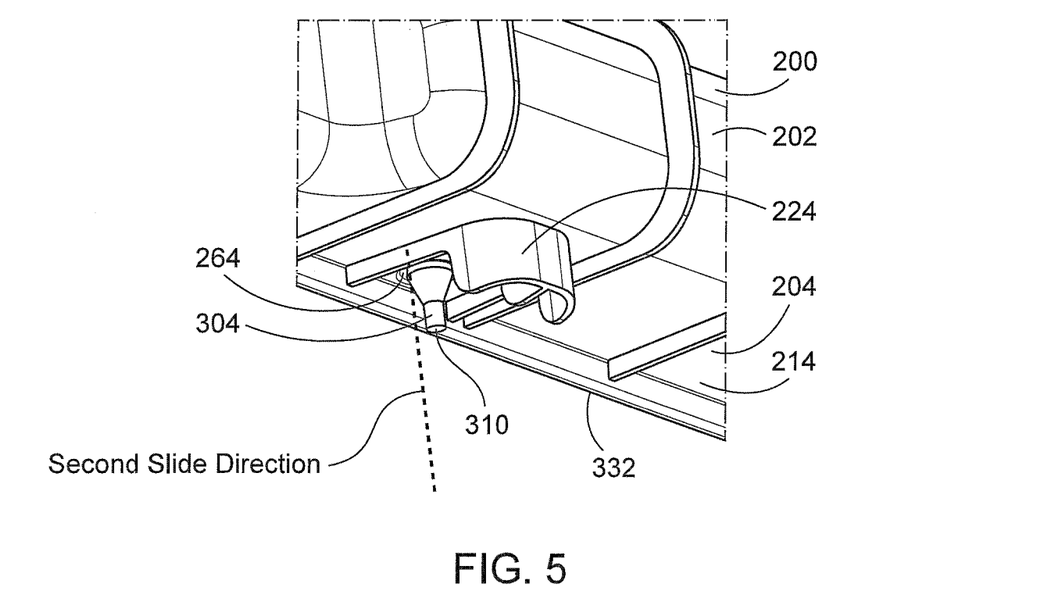
FIG. 5 depicts a partial bottom perspective view of the panel of FIG. 4A including a stopper.

FIG. 5 depicts a bottom perspective view of the panel 200 including the second standoff 224 and a stopper 304. As shown in FIG. 5, the stopper 304 is received in the second stopper hole 264 and supported on the panel 200 at the second stopper hole 264 such that when the panel 200 is assembled in a vehicle with a cargo lid (not shown) a distal end portion 310 of the stopper 304 complementary with the cargo lid is extended toward the cargo lid from the panel 200 to engage the cargo lid and dampen vibration between the cargo lid and the panel 200. In this manner, the second stopper hole 264 is configured for receiving the stopper 304 and supporting the stopper 304 on the panel 200. The stopper 304 is formed from a material that is flexible and elastic as compared to the panel 200. In an embodiment, the stopper 304 is formed from rubber.

With reference to FIGS. 4B-4D, the first stopper hole 252 and the third stopper hole 270 include similar features and function in a similar manner as the second stopper hole 264 described above. In this manner, the first stopper hole 252 and the third stopper hole 270 are respectively configured for receiving and supporting a stopper having a construction similar to the stopper 304 on the panel 200 and against the cargo lid when the panel 200 is assembled with the cargo lid such that each of the first stopper hole 252, the second stopper hole 264, and the third stopper hole 270 respectively support a stopper against the cargo lid when the panel 200 is assembled with the cargo lid in the vehicle. The stoppers supported in the first stopper hole 252, the second stopper hole 264, and the third stopper hole 270 are configured to respectively press against the cargo lid from the exterior surface 214 of the panel 200 to dampen vibration between the exterior surface 214 of the panel 200 and the cargo lid, and to maintain a spacing between the exterior surface 214 of the panel 200 and the cargo lid respectively at the first stopper hole 252, the second stopper hole 264, and the third stopper hole 270.

While, as depicted, the first stopper hole 252, the second stopper hole 264, and the third stopper hole 270 respectively have a circular profile taken in the first slide direction, the second slide direction, and the third slide direction, each of the first stopper hole 252, the second stopper hole 264, and the third stopper hole 270 may feature an alternatively shaped profile otherwise complementary with the stopper 304 for receiving the stopper 304 and supporting the stopper 304 on the panel 200 without departing from the scope of the present disclosure.

Figure 6:
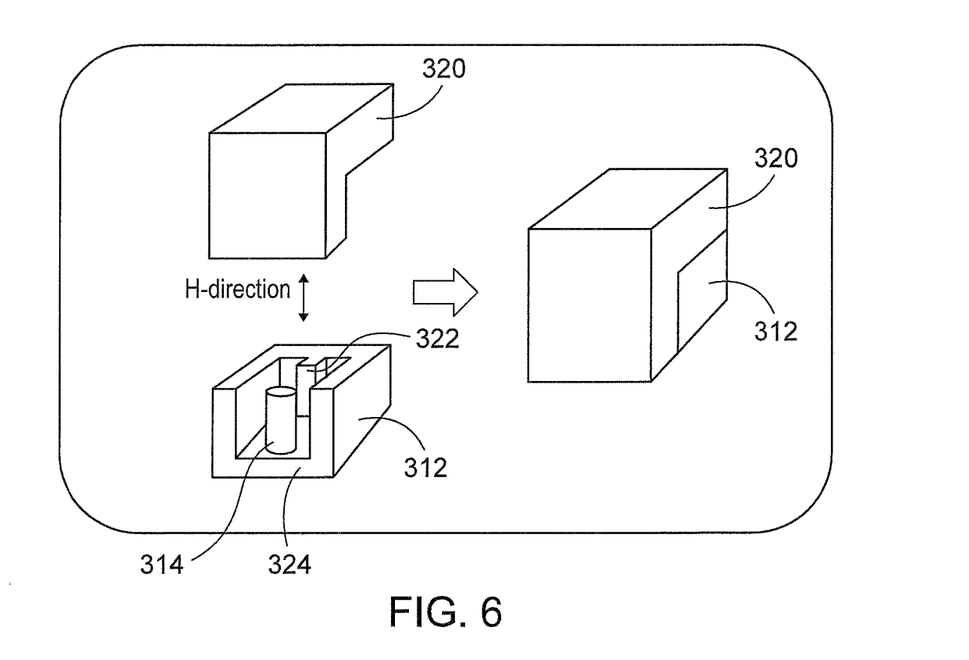
FIG. 6 depicts a schematic view of a method for forming a standoff and a stopper hole on the panel of FIG. 4A.

FIG. 6 depicts an exemplary method of manufacturing a standoff and a stopper hole with a panel, such as the first standoff 222 and the first stopper hole 252 with the panel 200, the second standoff 224 and the second stopper hole 264 with the panel 200, and the third standoff 230 and the third stopper hole 270 with the panel 200. As shown in FIG. 6, the method of manufacturing a standoff and a stopper hole with a panel features an injection molding process that includes driving a slide 312 in a slide direction toward a molding apparatus 320, wherein the slide 312 includes a projection 314 and a barrier 322 extended from a base portion 324 of the slide 312, and extended in the slide direction, wherein the barrier 322 defines a space in the slide 312.

The slide direction is a linear direction depicted as an H-direction that is the vertical or height direction of the panel 200. While the depicted slide direction is directed along the height direction of the panel 200, the slide direction may alternatively be a linear direction different from the height direction without departing from the scope of the present disclosure.

The process of injection molding depicted in FIG. 6 includes injecting a molding material into the space defined by the barrier 322 when the slide 312 is driven toward the molding apparatus 320 such that the molding material forms a standoff such as any of the first standoff 222, the second standoff 224, and the third standoff 230, respectively including the wall 234, 272, 290 disposed on the exterior surface 214 of the panel 200. When the molding material is injected into the slide 312, the projection 314 obstructs the molding material from traveling into a volume occupied by the projection 314, and the volume occupied by the projection 314 defines a stopper hole in the panel 200, such as the first stopper hole 252 in the panel 200, the second stopper hole 264 in the panel 200, and the third stopper hole 270 in the panel 200.

In this manner, the slide 312 and the molding apparatus 320 are configured to produce a standoff including a wall formed on the exterior surface 214 of the panel 200 by injecting a molding material in the space defined by the barrier 322 fixed with the slide 312, and are configured to produce a stopper hole defined in the panel 200 and formed around the projection 314 fixed with the slide 312, where the projection 314 obstructs the molding material from traveling into a volume occupied by the projection 314 when the molding material is injected into the space defined by the barrier 322, and the volume occupied by the projection defines the hole in the panel 200 in an injection molding process. The projection 314 has a circular profile taken in the slide direction and defines the stopper hole with a circular profile taken in the slide direction. The slide 312 is configured for selectively engaging the molding apparatus 320 by sliding toward the molding apparatus 320 in the slide direction for injecting the mold material between the slide 312 and the molding apparatus 320 and forming a standoff and a stopper hole in the panel, and by sliding away from the molding apparatus 320 in the slide direction to release the panel 200 including the standoff and the stopper hole from between the slide 312 and the molding apparatus 320.

In the method depicted in FIG. 6, the step of injecting the molding material into the slide 312 includes injecting the molding material into the space defined by the barrier 322 to form a standoff such as any of the first standoff 222, the second standoff 224, the third standoff 230 respectively including the wall 234, 272, 290 with the first wall section 240, 274, 292 and the second wall section 242, 280, 294, which is offset from the first wall section 240, 274, 292 in the lateral direction of the panel 200 along the exterior surface 214 of the panel 200.

As shown in FIG. 4B, when the slide 312 is configured to form the first standoff 222 and the first stopper hole 252, the barrier 322 defines the space in the slide 312 and engages the exterior surface 214 of the panel 200 to form a first slide parting line 330 which encircles the first stopper hole 252 and portions of the wall 234 including the first wall section 240, the second wall section 242, and the third wall section 244 on the exterior surface 214 of the panel 200. To this end, the first slide parting line 330 is disposed along an outer perimeter of the first standoff 222 including the second wall section 242 and the third wall section 244, and is disposed around the first stopper hole 252 along the exterior surface 214 of the panel 200 including at an edge 332 of the panel 200 on the second panel section 204.

With reference to FIG. 6, when the slide 312 is configured to form the first standoff 222 and the first stopper hole 252, the projection 314 is located on the slide 312 outside the space defined by the barrier 322 such that the first stopper hole 252 defined by the projection 314 is offset from the first standoff 222 in the lateral direction of the panel 200 along the exterior surface 214 of the panel 200 in the lateral direction of the panel 200, and is encircled by the first slide parting line 330. The projection 314 and the barrier 322 extend from the slide 312 toward the molding apparatus 320 in the first slide direction such that the first stopper hole 252 defined in the panel 200 extends in the first slide direction, and such that the wall 234 disposed on the exterior surface 214 of the panel 200, including the first wall section 240, second wall section 242, third wall section 244, extends in the first slide direction.

As shown in FIG. 4C, when the slide 312 is configured to form the second standoff 224 and the second stopper hole 264, the barrier 322 defines the space in the slide 312 and engages the exterior surface 214 of the panel 200 to form a second slide parting line 334 which encircles the second stopper hole 264 and portions of the wall 272 including the first wall section 274, the second wall section 280, and the third wall section 282 on the exterior surface 214 of the panel 200. To this end, the second slide parting line 334 is disposed along an outer perimeter of the second standoff 224 including the first wall section 274, the second wall section 280, and the third wall section 282, and is disposed around the second stopper hole 264 along the exterior surface 214 of the panel 200 including at the edge 332 of the panel 200 on the second panel section 204.

When the slide 312 is configured to form the second standoff 224, the projection 314 is located on the slide 312 within the space defined by the barrier 322 such that the corresponding second stopper hole 264 defined by the projection 314 is interposed between and separates the first wall section 274 and the second wall section 280 along the exterior surface 214 of the panel 200, and is encircled by the second slide parting line 334. Also when the slide 312 is configured to form the second standoff 224, the projection 314 and the barrier 322 extend from the slide 312 toward the molding apparatus 320 in the second slide direction such that the second stopper hole 264 defined in the panel 200 extends in the second slide direction, and such that the wall 272 disposed on the exterior surface 214 of the panel 200, including the first wall section 274, the second wall section, 280, and the third wall section 282, extends in the second slide direction.

The wall 272 forming the second standoff 224 defines a space in the second standoff 224 between the first wall section 274, the second wall section 280, and the third wall section 282 along the lateral direction of the panel 200 and the longitudinal direction of the panel 200 that extends from the exterior surface 214 of the panel 200 toward and through a distal end 340 of the second standoff 224 in the slide direction such that the first wall section 274, the second wall section 280, and the third wall section 282 define an opening in the distal end 340 of the second standoff 224. It will be appreciated that because the wall 272 is formed using the slide 312 configured to travel in the second slide direction, and because the wall 272 defines the space along the exterior surface 214 of the panel 200 that extends in the second slide direction from the exterior surface 214 of the panel 200 and through the distal end 340 of the second standoff 224, the second standoff 224 is devoid of a cap that connects the first wall section 274, the second wall section 280, and the third wall section 282, and covers the standoff in the slide direction to close the space defined between the first wall section 274, the second wall section 280, and the third wall section 282, such as the cap 184 depicted in FIG. 2C. Further, because the projection 314 is located on the slide 312 within the space defined by the barrier 322 such that the corresponding second stopper hole 264 defined by the projection 314 is interposed between and separates the first wall section 274 and the second wall section 280, the opening formed in the distal end 340 of the second standoff is sized to accommodate the projection 314 extending through the wall 272 in the slide direction between the first wall section 274, the second wall section 280, the third wall section 282, when the slide 314 is engaged with the molding apparatus 320, and the second standoff is devoid of a cap that connects the first wall section 274, the second wall section 280, and the third wall section 282, and covers the second standoff 224 in the second slide direction to close the space defined in the second standoff 224, such as the cap 184 depicted in FIG. 2C.

As shown in FIG. 4D, when the slide 312 is configured to form the third standoff 230 and the third stopper hole 270, the barrier 322 defines the space in the slide 312 and engages the exterior surface 214 of the panel 200 to form a third slide parting line 342 which encircles the third stopper hole 270 and portions of the wall 290 including the first wall section 292, the second wall section 294, and the third wall section 300 on the exterior surface 214 of the panel 200. To this end, the third slide parting line 342 is disposed along an outer perimeter of the third standoff 230 including the first wall section 292, the second wall section 294, and the third wall section 300, and is disposed around the third stopper hole 270 along the exterior surface 214 of the panel 200 including at the edge 332 of the panel 200 on the second panel section 204.

When the slide 312 is configured to form the third standoff 230, the projection 314 is located on the slide 312 within the space defined by the barrier 322 such that the corresponding third stopper hole 270 defined by the projection 314 is interposed between and separates the first wall section 292 and the second wall section 294 along the exterior surface 214 of the panel 200, and is encircled by the third slide parting line 342. Also when the slide 312 is configured to form the third standoff 230, the projection 314 and the barrier 322 extend from the slide 312 toward the molding apparatus 320 in the third slide direction such that the third stopper hole 270 defined in the panel 200 and the wall 290 disposed on the exterior surface 214 of the panel 200 extend in the third slide direction.

The first slide direction, the second slide direction, and the third slide direction are parallel with each other. With this construction, the slide 312 may be configured to form any combination of the first standoff 222, the first stopper hole 252, the second standoff 224, the second stopper hole 264, the third standoff 230, and the third stopper hole 270 in a single injection molding process using barriers and projections provided on the slide 312 with a construction similar to the barrier 322 and the projection 314.

The depicted panel 200 is configured for incorporation into a cargo assembly of a vehicle, however, the first standoff 222 and the first stopper hole 252, the second standoff 224 and the second stopper hole 264, and the third standoff 230 and the third stopper hole 270 can be formed on a panel or body otherwise configured for assembly with complementary parts configured for attachment with the panel or body without departing from the scope of the present disclosure.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the present disclosure.

The invention claimed is:

1. A panel comprising:
   a standoff formed from a wall extended in a height direction from an exterior surface of the panel, wherein the wall of the standoff is formed from a first wall section and a second wall section that is offset from the first wall section in a lateral direction of the panel along the exterior surface of the panel; and
   a stopper hole defined in the panel and extended in the height direction, in parallel with the first wall section and the second wall section, from the exterior surface of the panel, the stopper hole being configured for receiving a stopper formed from a material that is flexible and elastic as compared to the panel,
   wherein the stopper hole is interposed between and separates the first wall section and the second wall section along the exterior surface of the panel, or is offset from the wall of the standoff in the lateral direction of the panel along the exterior surface of the panel.

2. The panel according to claim 1, wherein the wall forming the standoff defines a space in the standoff between the first wall section and the second wall section along the lateral direction of the panel and a longitudinal direction of the panel, and wherein the space extends from the exterior surface of the panel through a distal end of the standoff in the slide direction such that the first wall section and the second wall section define an opening in the distal end of the standoff.

3. The panel according to claim 1, wherein the wall of the standoff is formed from the first wall section, the second wall section, and a third wall section oriented along the lateral direction of the panel and positioned between the first wall section and the second wall section in the lateral direction of the panel, and wherein the first wall section, the second wall section, and the third wall section at least partially encircle the stopper hole at the exterior surface of the panel such that the stopper hole is interposed between and separates the first wall section and the second wall section along the exterior surface of the panel, and along a length of the third wall section in the lateral direction of the panel.

4. The panel according to claim 3, wherein the wall includes a rib extended from the exterior surface of the panel in the height direction, and wherein the rib is oriented toward a longitudinal direction of the panel and intersects the third wall section at a location between the first wall section and the second wall section along the lateral direction of the panel.

5. The panel according to claim 3, wherein the first wall section, the second wall section, and the third wall section are integrally formed with each other.

6. The panel according to claim 1, wherein the standoff is integrally formed with the panel.

7. A panel comprising:
a standoff including a wall formed on an exterior surface of the panel by injecting a molding material in a space defined by a barrier fixed with a slide; and
a stopper hole defined in the panel and formed around a projection fixed with the slide, wherein the projection obstructs the molding material from traveling into a volume occupied by the projection when the molding material is injected into the space defined by the slide, and the volume occupied by the projection defines the stopper hole in the panel.

8. The panel according to claim 7, wherein the wall forming the standoff includes a first wall section and a second wall section, and the projection is located in the space defined by the slide such that the stopper hole formed around the projection is interposed between and separates the first wall section and the second wall section in a lateral direction of the panel along the exterior surface of the panel.

9. The panel according to claim 8, wherein the wall of the standoff is formed from the first wall section, the second wall section, and a third wall section oriented along the lateral direction of the panel and positioned between the first wall section and the second wall section in the lateral direction of the panel, and wherein the wall includes a rib extended from the exterior surface of the panel in a slide direction, and the rib intersects the third wall section at a location between the first wall section and the second wall section along the lateral direction of the panel.

10. The panel according to claim 7, wherein the projection is located outside the space defined by the slide such that the stopper hole formed around the projection is offset from the wall of the standoff in a lateral direction of the panel along the exterior surface of the panel.

11. The panel according to claim 10, wherein the slide is configured for selectively engaging a molding apparatus by sliding toward and away from the molding apparatus in a slide direction that is a height direction.

12. The panel according to claim 11, wherein the projection and the barrier extend from the slide toward the molding apparatus in the slide direction such that the stopper hole defined in the panel and the wall disposed on the exterior surface of the panel extend in the slide direction with respect to the panel.

13. The panel according to claim 7, wherein the stopper hole is configured for receiving a stopper formed from a material that is flexible and elastic as compared to the panel.

14. The panel according to claim 7, wherein the wall forming the standoff includes a first wall section and a second wall section, and defines a space in the standoff between the first wall section and the second wall section along a lateral direction of the panel and a longitudinal direction of the panel, and wherein the space extends through a distal end of the standoff in a slide direction such that the first wall section and the second wall section define an opening in the distal end of the standoff.

15. The panel according to claim 14, wherein the space extends from the exterior surface of the panel and through the distal end of the standoff in the slide direction.

* * * * *